United States Patent [15] 3,664,237
Paros [45] May 23, 1972

[54] PRESSURE SENSOR

[72] Inventor: Jerome M. Paros, Williamsville, N.Y.

[73] Assignee: Sundstrand Data Control, Inc., Redmond, Wash.

[22] Filed: Jan. 21, 1970

[21] Appl. No.: 4,576

[52] U.S. Cl. .................................92/38, 73/398 R, 73/410, 73/441 A
[51] Int. Cl. .........................................F01b 19/00, F16j 3/00
[58] Field of Search ..............73/398 R, 398 AR, 398 C, 410, 73/441 A, 407; 92/37

[56] References Cited

UNITED STATES PATENTS

| | | | |
|---|---|---|---|
| 3,552,199 | 1/1971 | Pugnaire | 308/2 A |
| 2,702,053 | 2/1955 | Baker | 73/407 |
| 2,816,443 | 12/1957 | Gomez et al. | 73/398 |
| 2,912,863 | 11/1959 | Naybor | 73/398 |
| 3,211,004 | 10/1965 | Spencer | 73/407 |

FOREIGN PATENTS OR APPLICATIONS 617,572  2/1955  Canada.....................................73/407

Primary Examiner—Martin P. Schwadron
Assistant Examiner—Clemens Schlmikowski
Attorney—Le Blanc & Shur

[57] ABSTRACT

Disclosed is a pressure sensor containing: (1) a mechanical assembly, consisting of a bellows-pivot arrangement such as to yield a torque about a single sensitive axis wherein pressure is applied to the bellows, and (2) the appropriate electronics, consisting of a detection device to sense angular motion and a torquing device to restore the mechanical assembly to its null position. The amount of electrically generated torque necessary to balance the pressure induced torque is proportional to and a measure of the applied pressure.

2 Claims, 12 Drawing Figures

Patented May 23, 1972

INVENTOR
JEROME M. PAROS

BY

Le Blanc & Shur
ATTORNEYS

Patented May 23, 1972  3,664,237

INVENTOR
JEROME M. PAROS

BY
Le Blanc & Shur
ATTORNEYS

Patented May 23, 1972

INVENTOR
JEROME M. PAROS

BY
Le Blanc & Shur
ATTORNEYS

PRESSURE SENSOR

This invention relates to an improved pressure transducer incorporating a novel pressure sensor and more particularly to a transducer of the force feedback type having improved accuracy, sensitivity, small size, and increased ruggedness. The pressure sensor and pressure transducer may be used in various configurations to measure either absolute or differential pressure.

The pressure sensor comprises a bellows sealed at one end and displaced from a flexible pivot such that when pressure is applied to its open port, the bellows exerts a torque about the pivot point of the flexure member. The direction of the torque is toward the pivot point in the case of over pressure and away from the pivot point in the event of an under pressure or vacuum applied to the bellows port. Also provided is a symmetrical arrangement with two bellows equally spaced about the pivot point in which differential pressure between the two bellows exerts a torque about the pivot point in the direction away from the bellows of higher applied pressure. In this sense, the operation is analogous to an equal arm balance or weighing scale. In the complete transducer, counter torque to restrain the instrument at its null position is generated by a feedback or servo loop including detection and torque producing elements.

Previous instruments in the field of pressure sensing (which operate in the range of from fractions of a psi to hundreds of psi) employ varying mechanical configurations of either Bourdon tubes, bellows, diaphragms, or liquid columns. In common usage is the Bourdon tube consisting of a thin flat tube sealed at one end which acts like a spring extending under over pressures and curling up when under pressures are applied. The deflection produced may actuate a mechanical pointer or electronic display. These devices are not null seeking or force balance type devices but must produce a deflection which is an indirect measure of the applied pressure. Furthermore, the Bourdon tube cannot be employed to measure differential pressure.

Liquid column instruments include the U-tube manometer, well type manometer, and inclined tube manometer. These instruments depend on the height of a liquid column to indicate the pressure head. They are not readily adapted to recording instruments, have slow response times, and are not small self-contained sensors.

Metal diaphragm type devices are usually used in special applications, such as fast response dynamic gages, due to the extremely small deflections produced under applied pressure. Larger deflections are produced with plastic or fabric diaphragms, however, these are not amenable to the production of precision measuring devices.

Bellows have been employed in pressure sensors of the servo or force balance type instruments. In one such instrument, a force balance is produced by a bellows-mechanical linkage assembly under applied pressure, the motion sensed and the instrument kept at its null position by a forcing device whose magnitude is proportional to the unbalance force. Devices of this type are extremely sensitive to linear acceleration.

In order to overcome these and other problems, there is disclosed in assignee's copending application, Ser. No. 812,193, filed Apr. 1, 1969, now abandoned and in assignee's copending application, Ser. No. 836,004, filed June 24, 1969, now U.S. Pat. No. 3,602,047 a bellows construction in which the bellows is restrained along one side by an attached pressure sensitive bending beam. Also provided in those applications is a differential pressure measuring device formed by two counteracting bellows. While devices of the type disclosed in the aforementioned copending applications have proved quite satisfactory, they suffer from the disadvantage that it is difficult to obtain two perfectly matched bellows. If the two bellows do not have the same sensitivity to applied pressure, then the forces produced, particularly at higher pressures, are not precisely counterbalanced, resulting in an output that has some inaccuracy.

The present invention avoids this difficulty by providing a pressure sensor in the form of a bellows which is attached to but spaced from a bending beam having a reduced cross section or necked down portion to define a precise flexure point for the beam. It forms a small, self-contained, highly precise sensor capable of operation over a large pressure range from fractions of a psi to hundreds of psi. The pressure sensor may be balanced so as to render it insensitive to linear accelerations by balancing the sensor mass about the flexure pivot point. By this arrangement, a symmetrical bellows construction which is symmetrical about the pivot point may be used to very precisely and exactly measure differential pressure. Since a differential pressure produces a torque about the pivot point, different bellows sensitivities may be compensated for by adjustment of the distance between the bellows and the pivot point. The pivot is extremely flexible about the sensitive axis, thus making possible the measurement of very slight pressure differentials. High rigidity of the pivot point about the two other mutually perpendicular axes decreases the sensitivity to cross axis forces and increases the instrument's ruggedness and reliability. Incorporation of the bellows-pivot arrangement into a servo or force feedback system yields a direct measurement of the applied pressure or pressure differential.

According to a preferred embodiment of the present invention, a double bellows arrangement, symmetrically placed about a pivot point, is attached at one end to a movable plate forming part of a capacitive pickoff. The electrical restoring torque which counteracts the unbalanced pressure produced torque is generated by passage of a current through an annular forcer coil mounted on the moving plate while positioned in the field of a permanent magnet. The forcer coil is connected through an electrical circuit to a capacitive pickoff which includes the movable plate such that the coil forms a part of the feedback or servo loop and the current flowing in the coil necessary to maintain the torque balance is proportional to the applied pressure.

One bellows may be evacuated and sealed to form an absolute pressure sensor. For differential pressure measurements, the adjustable pivot point is provided to exactly match the torque sensitivities of each bellows to applied pressure. The assembly is mass balanced so as to render the device insensitive to external forces.

It is therefore one object of the present invention to provide an improved pressure transducer.

Another object of the present invention is to provide an improved pressure sensor in the form of a bellow-flexible pivot arrangement.

Another object of the present invention is to provide a pressure sensor which produces an output indicative of torque rather than displacement.

Another object of the present invention is to provide a pressure sensor consisting of a double bellows-pivot arrangement particularly suited for measuring differential pressure.

Another object of the present invention is to provide an adjustable pivot point in a double bellows-pivot point arrangement such as to match the sensitivities of the instrument when the same magnitude pressures are applied to either bellows.

Another object is to provide a pressure sensor balanced about all axes so as to be insensitive to external forces.

Another object of the invention is to provide an improved servo loop type pressure sensor incorporating a bellows-pivot arrangement.

Another object of the present invention is to provide a servo pressure transducer which measures torque rather than displacement and which incorporates as a part of the transducer a forcer coil and capacitive pickoff including a movable plate attached to a bellows-pivot arrangement.

These and further objects and advantages of the invention will be more apparent upon reference to the following specification, claims, and appended drawings, wherein:

Figure 1:
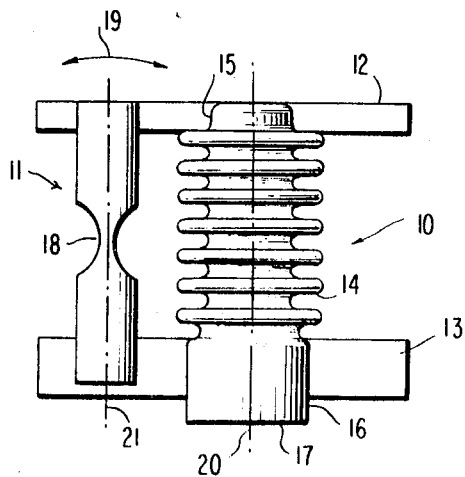
FIG. 1 is a front view of a bellows flexure hinge pivot assembly constructed in accordance with the present invention.
Figure 1A:
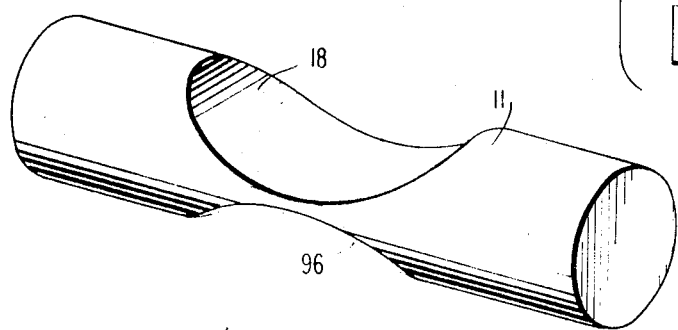
FIGS. 1A and 1B are isometric views of flexure pivot elements usable in the assembly of FIG. 1.

Referring to the drawings, FIG. 1 shows a bellows-pivot assembly constructed in accordance with the present invention comprising a metal bellows 10 separated from a flexure hinge pivot 11 and connected together by plates 12 and 13. The bellows is provided with a series of corrugations or convolutions 14 and is sealed at one end by an end cap 15 which may be formed integral with the corrugations or joined as a separate plug. The other end of the bellows is provided with a straight tubular section 16 terminating in an open end 17 adapted to receive a pressure fluid, such as air, gas, liquid, or the like. The pivot is a flexure hinge formed from round or rectangular stock with a locally necked down portion 18. FIG. 1A shows a flexure hinge formed from round stock, while in FIG. 1B the flexure hinge 11' with the necked down portion 18' is formed from rectangular stock. The flexure is extremely compliant about one axis and flexes easily in the directions shown by arrow 19 upon application of bending forces generated by the application or withdrawal of pressure in the bellows through port 17; however, the flexure is quite stiff about the two nonsensitive mutually perpendicular axes and is thus unresponsive to external forces along those axes. Plates 12 and 13 form the connecting assembly between the bellows and pivot, thus setting the nominal moment arm, or distance between the centerline 20 of the bellows and centerline 21 of the flexure, over which the pressure induced force acts. The bellows and flexure are made from the same or similar materials, such as stainless steel, copper, or the like, so as to minimize errors induced by differential temperature growth. The flexure pivot and bellows are connected to the plates 12 and 13 by solder, welding, brazing, or the like.

Figure 2:
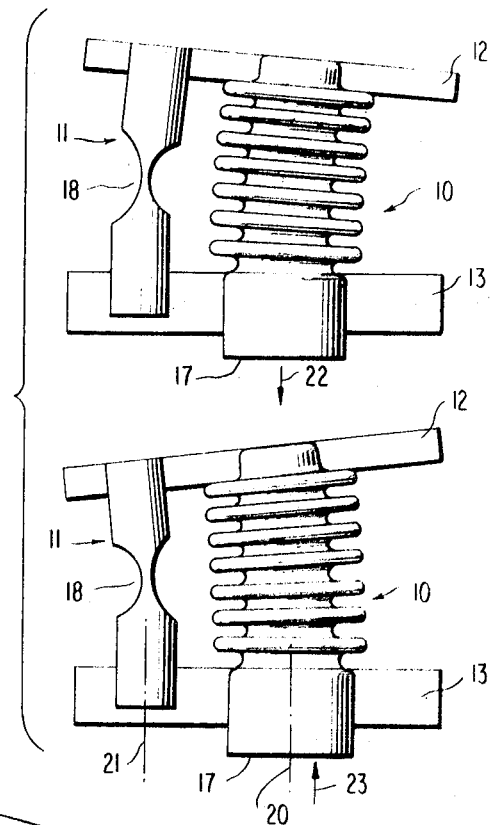
FIG. 2 illustrates the operation of the bellows-pivot assembly when subjected to over pressure and under pressure.

FIG. 2 shows the deflection of top plate 12 relative to the fixed bottom plate 13 when the bellows 10 is subjected to both over pressure and under pressure. When fluid at a pressure above ambient, as indicated by arrow 23, is applied through the open end 17 of the bellows 10, the force generated in the bellows, acting over the distance between centerlines 20 and 21, produces a torque which deflects the assembly about the localized necked down portion 18 of flexure hinge 11. The amount of deflection is proportional to the over pressure within the bellows. Similarly, when the bellows is evacuated to a pressure less than ambient, as indicated by arrow 22 in FIG. 2, then the deflection is in the opposite sense.

Figure 3:
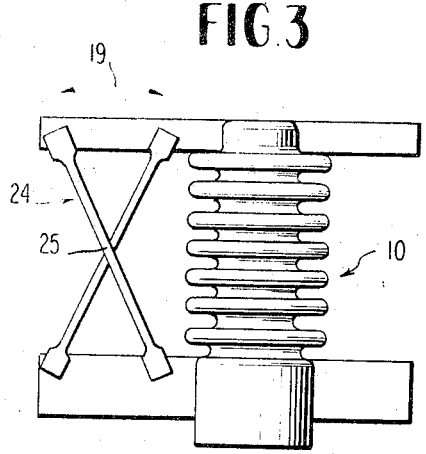
FIG. 3 shows a modified bellows-pivot arrangement employing flexure strips.

FIG. 3 shows a modified construction in which the pivot is constructed of thin flexure strips 24 which readily flex about an axis perpendicular to the plane of the paper through pivot point 25 but which is stiff in the cross axes directions. As discussed previously, pressure applied within the bellows 10 will torque and flex the assembly in the direction shown by arrow 19.

Figure 4:
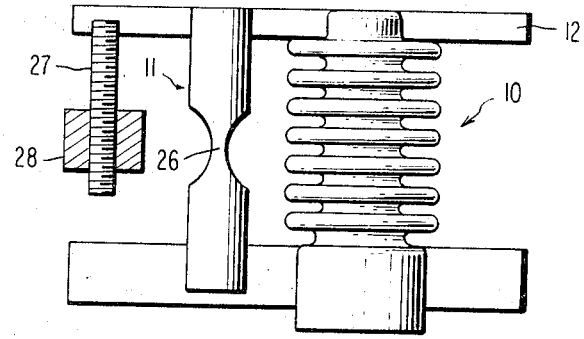
FIG. 4 shows a bellows-pivot-balance weight construction which is insensitive to external forces.

A method for making the bellows-pivot construction insensitive to acceleration forces is shown in FIG. 4. A balance weight 28, of the proper size, is moved along the threaded member 27 such that the center of gravity of the movable system, i.e., bellows 10, flexure hinge 11, top plate 12, and balance adjust 27 and 28, lies substantially at the pivot point 26. This point is midway along the flexure axis of hinge 11 at centerline 21 (FIG. 1). Thus, with the center of gravity balanced to be at the pivot point, transverse accelerations produce no deflections and have no effect on the output of the instrument.

Figure 5:
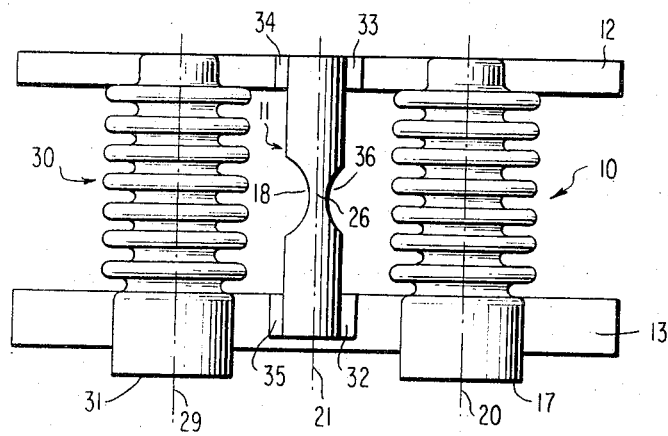
FIG. 5 shows a double bellows-adjustable pivot construction particularly suited for measurement of differential pressures.

FIG. 5 shows a double bellows-pivot arrangement which may be used to measure differential pressures. The mechanical sensing element consists of two bellows 10 and 30 symmetrically arranged about pivot point 26 of flexure hinge 11. The bellows and pivot are connected by end plates 12 and 13. When a gas or fluid at a pressure above ambient is supplied to bellows 10 through port 17, the force generated acts over the distance between bellows centerline 20 and pivot centerline 21 to produce a counterclockwise torque about an axis through pivot point 26. When a gas the fluid at a pressure above ambient is supplied to bellows 30 through port 31, the force generated acts over the distance between bellows centerline 29 and pivot centerline 21 to produce a clockwise torque about an axis through pivot point 26. Theoretically, when equal pressures are simultaneously applied to both bellows, then no angular deflection about pivot point 26 should occur since the clockwise torque from bellows 30 is equal to the counterclockwise torque from bellows 10. Any differential between the pressures applied to the bellows 10 and 30 will yield a resultant torque and an angular deflection in he direction away from the bellows of higher applied pressure. This deflection is proportional to the difference in pressure being applied to bellows 10 and 30.

Figure 1B:
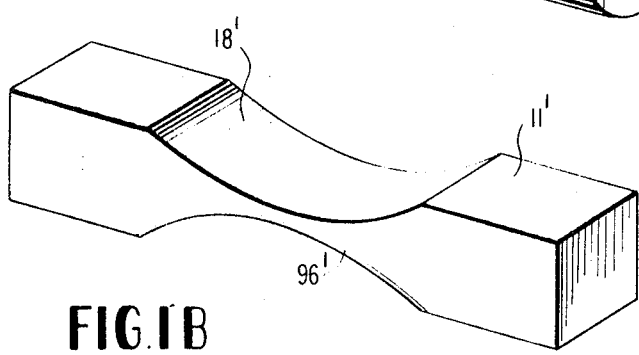

In actual practice, manufacturing tolerances are such that the sensitivities of the two bellows cannot be perfectly matched; i.e., equal pressures applied to each bellows do not precisely generate equal forces. This is a serious limitation to prior devices since the bellows mismatch affects the use of the instrument as a differential pressure gage while absolute pressure in both bellows varies. As an illustration, assume that the bellows have a 1 percent mismatch and that a measurement of differential pressure of 0.1 psi is required. With one bellows at 0 psi and the other at 0.1 psi, an accurate measurement may be obtained; however, with one bellows at 30.0 psi and the other at 30.1 psi (the same 0.1 psi differential as with absolute pressure equal zero) an accurate measurement is not possible since the 1 percent mismatch of the absolute pressure of 30 psi yields a measurement uncertainty band of 0.3 psi. The present invention eliminates this problem by providing an adjustable pivot point which allows perfect matching of the torque sensitivities for each bellows. Thus, the moment arm, or distance between centerline 21 of pivot point 26 and the bellows centerlines 20 and 29, is increased for the bellows which produces the lower force for equal applied pressure and the distance is decreased for the bellows producing the higher force for equal applied pressure. Adjustment of the moment arm distance to the pivot point may be accomplished in a variety of ways. In FIG. 5, thin pieces of metal, or shims, 32, 33, 34, and 35, are placed on the appropriate side of flexure hinge 11. These shims are inserted into apertures in the plates 12 and 13 receiving the ends of hinge 11. Thus, discrete steps of adjustment equal to the shim thickness may be accomplished. Fine continuous adjustment is obtained by removal of or addition of material to the localized necked down portions 18 and 36 of flexure hinge 11. Material may be removed by mechanical abrasion; for example, grinding, lapping, polishing, scraping. Chemical etching may also be employed to remove fine amounts of hinge material. The pivot point may be moved by adding material to one side by means of selective plating, thin films of solder, or various bonding agents. FIG. 1A indicates the added material by dotted line 96 and FIG. 1B shows dotted line 96' where material has been removed to adjust the pivot axis. The flexure strip pivot shown in FIG. 3 may also be adjusted in position by the aforementioned methods. Thus, by means of an adjustable pivot position, a differential pressure gage is constructed to yield no erroneous output when equal pressure is applied to both bellows simultaneously. Evacuation and sealing of one bellows enables conversion of the device to that of an absolute pressure sensor.

Figure 6:
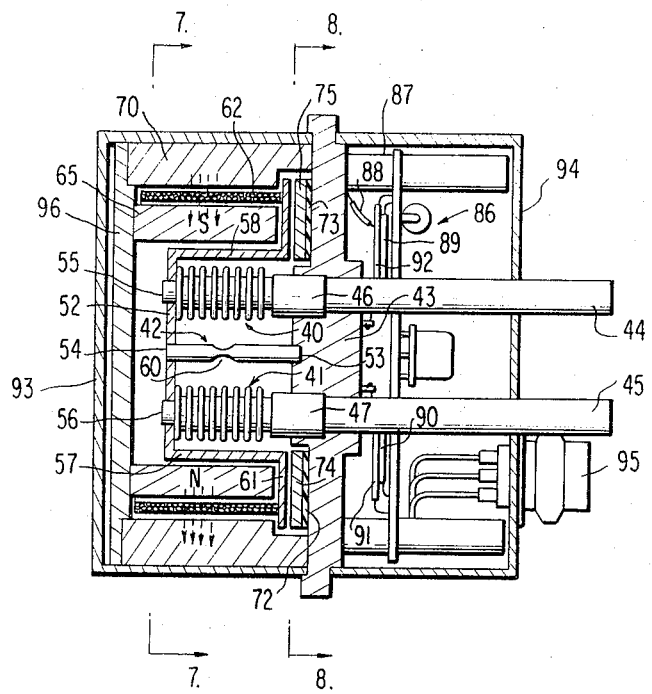
FIG. 6 is a view with parts in section showing an overall servo pressure sensor constructed in accordance with the present invention.

FIG. 6 is a view with parts in section showing an overall servo pressure transducer constructed in accordance with the present invention. The sensor is of the differential type and contains the double bellows-adjustable pivot construction described previously which consists of bellows 40 and 41 symmetrically placed about flexure hinge pivot 42. The straight, tubular, open ended sections 46 and 47, as well as end 53 of flexure hinge 42, are soldered or brazed into base plate 43. Supply tubes 44 and 45, which are also brazed or soldered into base plate 43, provide the inlet ports for the pressure fluid which communicates with bellows 40 and 41 through tubular sections 46 and 47. The sealed ends 55 and 56 of bellows 40 and 41 and end 54 of flexure hinge 42 are soldered or brazed to end plate 52 which is integral with sides 57 and 58 to the laterally extending annular flange 61. Flange 61 serves as the movable plate in a capacitive pickoff as well as the support for annular forcer coil 62. Fixed capacitance plates 74 and 75 are electrically insulated from base plate 42 by circular segments 72 and 73 which together with movable plate 61 form a differential capacitive pickoff for the servo transducer. The forcer coil 62 surrounds a magnet 65 which is linearly polarized in the plane of the paper as shown in FIG. 6. An annular magnet return ring 70 is used to complete the magnetic circuit. As shown the flux lines go from the north pole of the magnet through the adjacent side of coil 62 around both halves of soft iron ring 70 and by way of the opposite side of coil 62 to the south pole of the magnet. A nonmagnetic spacer 96 separates the magnet 65 and annular return ring 70 from the housing 93.

Figure 7:
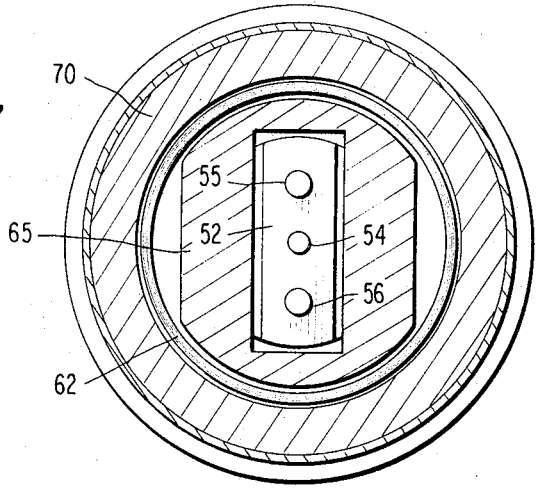
FIG. 7 is a cross section taken along line 7—7 of FIG. 6.

FIG. 7, which is a sectional view of FIG. 6, more clearly shows the shapes and relationships described previously. The bellows end caps 55 and 56 and flexure hinge end 54 are attached to end plate 52 which is integral with the moving capacitance plate and serves as a support for forcer coil 62. Not attached to the moving system but positioned between end plate 52 and coil 62 is permanent magnet 65. The magnetic return path is completed through annular section 70.

Figure 8:
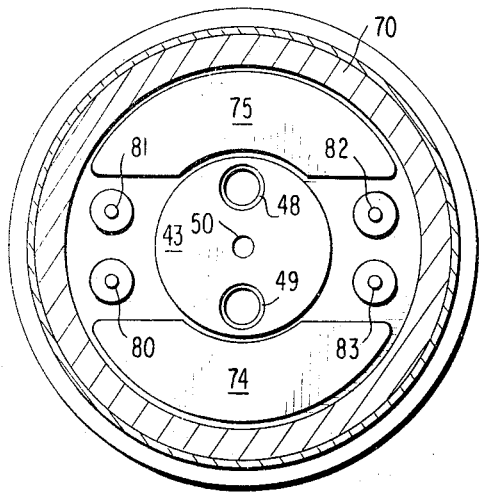
FIG. 8 is a cross section taken along line 8—8 of FIG. 6.

FIG. 8 is a sectional view through FIG. 6 showing receptacles 48, 49, and 50 into which the two open bellows ends and flexure hinge are respectively soldered or brazed into base plate 43. Fixed capacitance plates 74 and 75 are shown as well as electrical feedthrough terminals 80, 81, 82, and 83. Fixed capacitance plates 74 and 75 are electrically attached to feedthrough terminals 80 and 81 respectively. Flexible electrical leads from the forcer coil are brought from the moving system to terminals 82 and 83. Referring to FIG. 6, movable capacitance plate 61 is integral with end plate 52 and connected through the bellows and flexure hinge to grounded base plate 43. The grounded movable plate is connected to the electronic circuitry 86 by means of flexible lead 88 to metal spacer 87. The forcer coil leads 89 and 90 and fixed capacitance plate leads 91 and 92 are connected to the electronic circuitry 86 from the opposite ends of the feedthrough terminals 82, 83, 80, and 81, shown in FIG. 8. FIG. 6 also shows electrical connector 95 through which power is supplied to the servo electronics and the output signal exits. Housing 94, through which supply tubes 44 and 45 pass and connector 95 is mounted, also acts as a cover for the electrical assembly.

The moving system, consisting of the bellows, pivot, moving plate and forcer coil, is balanced about an axis through pivot point 60 such that the assembly is insensitive to acceleration forces. Balancing may be achieved by addition of weights to the movable plate or by movement of flexure hinge 42. As discussed previously, the torque sensitivities of the two bellows may be matched by adjustment of pivot point 60 toward the bellows of higher sensitivity in order to provide an improved differential pressure sensor. The adjustment may be made by placement of shims or the addition or removal of hinge material near pivot point 60. Evacuation and sealing of one of the supply tubes 44 or 45 yields an absolute pressure sensor.

Operation of the sensor will be described with reference to FIG. 6. Application of an over pressure to bellows 40 through supply tube 44 generates a force which is transmitted through end plate 52 to provide a counterclockwise torque and resultant deflection about pivot point 60. The angular deflection brings the movable capacitance plate 61 into closer proximity to fixed plate 74 while the opposite side of plate 61 moves away from fixed plate 75. The capacitance change is detected and an electrical current is sent through coil 62 in the field of permanent magnet 65 to produce a counteracting torque which restores the assembly to its null position. The current is thus proportional to and a measure of the applied pressure.

Figure 9:
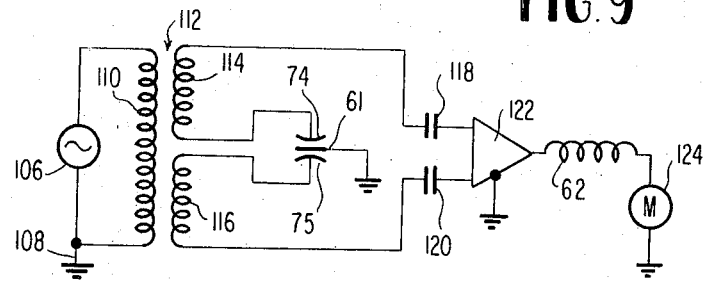
FIG. 9 shows a circuit diagram for the pressure sensor of FIG. 6.

FIG. 9 is a simplified circuit diagram of the pressure sensor. The circuit comprises an AC source or generator 106 operating by way of example only at a frequency of about 6 megahertz. One side of source 106 is grounded as at 108 and connected across it is the primary 110 of an isolating transformer 112. Transformer 112 is provided with two secondary windings 114 and 116, one side of the transformer secondaries being connected through capacitors 118 and 120 to the inputs of a differential amplifier 122. The output of amplifier 122 is proportional to the difference between the signals at its two inputs and the amplifier develops an output signal causing current to flow through the forcer coil 62, the amount of this current being indicated by a meter 124. The other sides of the transformer secondaries 114 and 116 are connected to the stationary plates 74 and 75 which, together with grounded moving plate 61, form a differential capacitor.

When plate 61 is in its center position, the signals on the secondary windings of the transformer are balanced and no signal is developed at the point of amplifier 122. However, as movable capacitor plate 61 tends to move with a deflection of the bellows-pivot assembly under pressure, an unbalance in the signal between the two inputs of the amplifier 122 occurs and a signal is developed at the output of the amplifier in the form of a current through forcer coil 62 which generates a counter-torque causing to restore capacitor plate 61 to its initial position. The amount of current flowing through forcer coil 62 to produce a torque balance condition in the transducer is proportional to the pressure differential in the two bellows and the amount of this current is indicated by meter 124 which gives a direct indication of the differential pressure.

Figure 10:
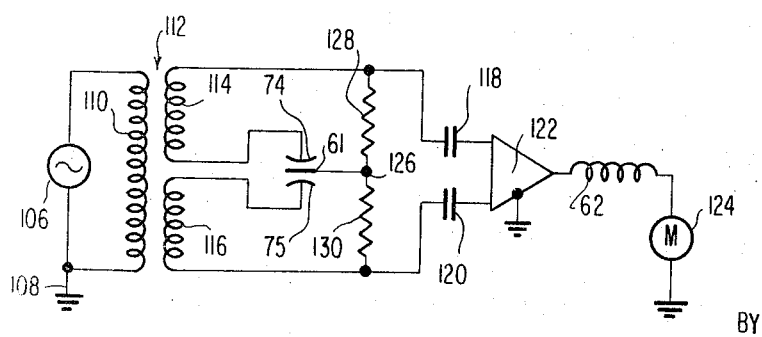
FIG. 10 shows a modified circuit diagram for the pressure sensor of FIG. 6.

FIG. 10 shows a circuit diagram of a modified circuit for the transducer of FIG. 6. In FIG. 10, like parts bear like reference numerals and the circuit of FIG. 10 is similar to the circuit of FIG. 9 described above with the exception that the moving plate 61 is not grounded but instead is returned to a terminal 126, i.e., is returned to the midpoint between a pair of resistors 128 and 130 connected across the differential capacitor. Resistors 128 and 130 are provided in the circuit of FIG. 10 to take the DC leakage off the plates of the differential capacitor.

It is apparent from the previous discussion that the present invention provides an improved pressure sensing element and an improved servo pressure transducer. The unit is small, self-contained, highly accurate, and capable of operation over a large pressure range from small fractions of a psi to hundreds of psi. The instrument may be easily balanced to make it insensitive to acceleration forces. The pivot is extremely flexible about the sensitive axis, thus providing negligible mechanical restraint and making the counteracting torque generated by the electrical current a direct measure of the applied pressure. The symmetrical bellows-pivot construction is ideal for differential pressure measurements since by means of an adjustable pivot the torque sensitivities of the two bellows may be exactly matched. This means that even when high pressures are equally applied to both bellows, no angular deflection will result. However, when even a slight differential pressure is applied, the moving system will tend to deflect because of the great flexibility of the pivot. Movement of the pivot point can also be used to place the center of gravity at the pivot point, thus balancing the device and making it insensitive to linear forces. High rigidity of the pivot in the cross axes directions improves the sensor's ruggedness. Incorporation of the sensing element into a servo loop yields a direct measurement of the applied pressure or pressure differential.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A pressure sensor comprising first and second bellows each having a closed end and at least one having an open end, a metal bar spaced from but positioned between said bellows with its longitudinal axis substantially parallel to the longitudinal axis of each of said bellows, a rigid plate joining said closed ends of said bellows to one end of said bar, means rigidly mounting the other end of said bar and the ends of said bellows remote from said closed ends, said bar having a necked down portion intermediate its ends defining a pivot axis perpendicular to the plane containing said longitudinal axes, said bar having material added to said necked down portion to displace said pivot axis from the midpoint between said bellows to compensate for differences in bellows pressure sensitivity, said midpoint being displaced toward the bellows of greater pressure sensitivity, whereby when a pressure fluid is introduced into one of said bellows a torque and resultant deflection of both said bellows and said bar is produced about said pivot axis representative of the differential pressure between said bellows.

2. A pressure sensor comprising first and second bellows having a closed end and at least one having an open end, a metal bar spaced from but positioned between said bellows with its longitudinal axis substantially parallel to the longitudinal axis of each of said bellows, a rigid plate joining said closed ends of said bellows to one end of said bar, means rigidly mounting the other end of said bar and the ends of said bellows remote from said closed ends, said bar having a necked down portion intermediate its ends defining a pivot axis perpendicular to the plane containing said longitudinal axes, said bar having material removed from said necked down portion to displace said pivot axis from the midpoint between said bellows to compensate for differences in bellows pressure sensitivity, said midpoint being displaced towards the bellows of greater pressure sensitivity, whereby when a pressure fluid is introduced into one of said bellows a torque and resultant deflection of both said bellows and said bar is produced about said pivot axis representative of the differential pressure between said bellows.

* * * * *